United States Patent [19]

Rasmussen

[11] 4,326,049

[45] Apr. 20, 1982

[54] PHASE TRANSFER FREE-RADICAL POLYMERIZATION

[75] Inventor: Jerald K. Rasmussen, Stillwater, Minn.

[73] Assignee: Minnesota Mining and Manufacturing Company, Saint Paul, Minn.

[21] Appl. No.: 76,529

[22] Filed: Sep. 18, 1979

[51] Int. Cl.³ .......................... C08F 4/50; C08F 4/48; C08F 20/18

[52] U.S. Cl. ..................................... 526/91; 526/193; 526/204; 526/211; 526/217; 526/328; 526/310

[58] Field of Search ................. 526/91, 193, 204, 205, 526/206, 209, 217, 225, 218, 219, 220, 210

[56] References Cited

U.S. PATENT DOCUMENTS

| | | | |
|---|---|---|---|
| 3,408,349 | 10/1968 | Matsunaga | 526/205 X |
| 3,634,371 | 1/1972 | Pohlemann | 526/220 X |
| 3,755,278 | 8/1973 | Patron | 526/204 X |
| 3,856,768 | 12/1974 | Halasa | 526/181 |
| 3,965,116 | 6/1976 | Cram | 260/340.3 |
| 3,966,766 | 6/1976 | Lehn | 260/239 R |
| 3,987,061 | 10/1976 | Pedersen | 260/340.2 |
| 3,992,432 | 11/1976 | Napier | 260/465.1 |
| 3,997,565 | 12/1976 | Kauer | 260/340.3 |
| 4,001,279 | 1/1977 | Cram | 260/340.3 |
| 4,018,832 | 4/1977 | Hyatt | 252/364 |
| 4,024,158 | 5/1977 | Kauer | 260/340.3 |
| 4,043,979 | 8/1977 | Cram | 525/384 |
| 4,059,556 | 11/1977 | Neukam | 526/204 X |
| 4,131,728 | 12/1978 | Priddy | 526/204 |

OTHER PUBLICATIONS

Chem. Abst., 90, 187398.
Chem. Abst., 90, 187436.

*Primary Examiner*—C. A. Henderson
*Attorney, Agent, or Firm*—Cruzan Alexander; Donald M. Sell; Richard Francis

[57] ABSTRACT

A process for polymerizing olefinic monomeric material comprising adding a novel water-soluble free-radical initiator-phase transfer agent complex to an organic liquid comprising free-radical polymerizable ethylenically unsaturated monomeric material and activating the same therein to produce free-radicals.

8 Claims, No Drawings

PHASE TRANSFER FREE-RADICAL POLYMERIZATION

1. FIELD OF THE INVENTION

This invention relates to a process for polymerizing ethylenically unsaturated monomeric material in an organic liquid utilizing a novel organic-soluble complex of an organic phase transfer agent and a water-soluble, organic-insoluble free-radical initiator.

2. BACKGROUND OF THE INVENTION

The majority of all polymers produced by polymerization of ethylenically unsaturated monomers are prepared with the aid of ingredients, called free-radical catalysts or initiators, which provide for the initiation and propagation of the growing chains through a free-radical mechanism. Such catalysts are compounds, generally organic compounds, that under the conditions of the reaction, slowly decompose and produce fragments which carry with them an unbonded or unpaired (lone or free) electron. This unbonded electron, sometimes called an or orbital electron, reacts with the electrons of a colliding monomer to form a covalent sigma bond (the initiation process), with the reproduction of a new unpaired electron which is capable of repeating this process and propagating a chain. In the light of this mechanism, the catalysts are free-radical formers or free-radical initiators.

Free-radicals have been generated in a number of ways, including thermal or photochemical decomposition of such compounds as organic peroxides or hydroperoxides, or azo or diazo compounds. Two well known reactions commonly used to produce free-radicals for polymerization include the decomposition of benzoyl peroxide and of azobisisobutyronitrile.

The stability of free-radicals varies over a wide range. Primary free-radicals are more reactive than secondary free-radicals, which in turn are more reactive than tertiary free radicals. Phenyl free-radicals are more reactive than benzyl free-radicals. Allyl free-radicals are quite unreactive.

Reaction rate control of free-radical initiated polymerization is sometimes troublesome because, once initiated, such reactions tend to progress rapidly, creating undesirable exotherms and limiting the scope of the polymeric product types. Such polymerization reactions are carried out most commonly in an organic phase because the monomeric materials, being organic, are soluble in organic reaction media. Some reactions are carried out in an aqueous phase, mainly as emulsions.

SUMMARY OF THE PRESENT INVENTION

The present invention provides a novel process for polymerizing ethylenically unsaturated monomeric material by adding a complex of a water-soluble free-radical initiator and an organic phase transfer agent to an organic liquid comprising free-radical polymerizable ethylenically unsaturated monomeric material. The water-soluble free-radical initiator and the phase transfer agent form an organic-soluble complex which is soluble in the organic liquid wherein, upon activation of the free radical initiator, free-radical polymerization is initiated. As far as applicant knows, the use of a phase transfer agent to facilitate the free-radical polymerization of ethylenically unsaturated polymeric material was not known before the present invention. This method of delivering free-radical catalyst to the organic phase containing the monomer provides a unique degree of control over the free-radical polymerization reaction rate.

Phase transfer agents or catalysts are known in the field of chemistry to facilitate the bringing together of mutually insoluble chemical reagents which do not generally have a common solvent. A discussion of phase transfer catalysts may be found in *Phase Transfer Catalysis: Principles and Techniques* by Charles M. Starks and Charles Liotta, Academic Press, New York, 1978. This article recognizes that in principle cations, free-radicals, whole molecules, or even energy may be transferred from one phase to another using a phase transfer agent. A number of reports have appeared on the influence of phase transfer agents, e.g., crown ethers, on anionic polymerization, e.g., G. W. Gokel and H. D. Durst, *Synthesis* 168 (1976); S. Alev, F. Schue' and B. Kaempf, *J. Polym. Sci., Polym. Letters Ed.*, 13, 397 (1975); B. Yamada, Y. Yasuda, T. Matsushita and T. Otsu, ibid., 14, 277 (1976); A. F. Halasa and T. C. Cheng, U.S. Pat. No. 3,856,768 (1974); *J. Polym. Sci., Polym. Chem. Ed.*, 14, 583 (1976); J. A. Orvik, *J. Amer. Chem. Soc.*, 98, 3322 (1976); S. Slomkowski and S. Penczek, *Macromolecules*, 9, 367 (1976); A. Defieux and S. Boileau, ibid., 9, 369 (1976); T. Suzuki, Y. Murakami, Y. Tsuji and Y. Takegami, *J. Polym. Sci., Polym. Letters. Ed.*, 14, 675 (1976). S. Kopelw et al., *Macromolecules*, 6, 133 (1973), have prepared various styryl-crown ether adducts and have polymerized these both anionically and free-radically (using azobisisobutyronitrile as an initiator). The use of phase transfer agents to facilitate free-radical polymerization, or as part of a free-radical catalyst system is, however, unknown to applicant.

The process of the present invention extends the use of typically organic-insoluble free-radical initiators into solution and bulk processes, whereas previously they could only be used in water-based systems such as in emulsion polymerizations. This is advantageous since the organic-insoluble initiators in question are generally more stable and therefore present fewer storage and handling problems as opposed to typically organic-soluble initiators, many of which require refrigeration. Since the organic-soluble complexes or adducts are prepared in situ, they do not present problems associated with preparation and handling inherent with somewhat related initiators known in the art, e.g., as in U.S. Pat. No. 3,634,371.

The process of the present invention permits substantially organic-insoluble free-radical initiators to be used in organic systems for the polymerization of ethylenically unsaturated monomers. Quite surprisingly, the process of the invention allows such polymerizations to be carried out at substantially lower temperatures and/or in much shorter reaction times than those previously possible using common organic-soluble initiators. This surprising feature provides a tremendous advantage, especially in bulk or high solids solution polymerizations, in reducing problems associated with heat dissipation. Shorter reaction times also have their obvious economic advantages.

The process of the invention is carried out by
(1) placing in a suitable vessel an organic liquid comprising a polymerizable, ethylenically unsaturated monomeric material, optionally containing organic solvent;

(2) adding to the organic liquid (a) sufficient water-soluble organic-insoluble free-radical initiator to polymerize said monomeric material, optionally dissolved in a minimum quantity of water; (b) sufficient organic phase transfer agent, typically a stoichiometric amount based upon the amount of free-radical initiator, to complex with the water-soluble organic-insoluble free-radical initiator to produce an adduct which is soluble in said organic liquid;

(3) activating said adduct to produce free-radicals; and (4) permitting the free-radicals to cause the monomeric material to polymerize.

The novel free-radical initiator compounds of the invention (referred to herein as a complex or an adduct) are characterized by being the chemical reaction product of a water-soluble, organic-insoluble free-radical initiator, and an organic phase transfer agent. The preferred adducts have the general formula, $(Q^+)_n X^{n-}$, wherein $Q^+$ represents an organically-soluble residue of a phase transfer agent and $X^{n-}$ represents the anionic residue of a free-radical initiator (organic or inorganic) which is capable, via thermal or photochemical activation, of producing free-radicals sufficient to initiate free-radical polymerization, and "n" is an integer, usually 1 or 2.

Preferably, $Q^+$ is a (1) cationic complex of an alkali or alkaline earth metal or ammonium cation and a neutral donor molecule selected from the group consisting of macrocyclic multidentate or "crown" compounds, linear or branched multidentate compounds, amines, hexamethylphosphoric triamide, and amphoteric compounds, or (2) a cation of the general formula $(A_m M)^+$, where A is an organic radical having from one to eighteen carbon atoms bonded to M by m covalent linkages, and M is an element selected from the Groups VA and VIA of the Periodic Table of Elements.

Preferably, $X^{n-}$ is an anion selected from the group consisting of mono- and di-anions of peroxydisulfuric acid, peroxydiphosphoric acid and peroxydicarbonic acid, peroxymonosulfate, azo free radical generators, e.g., mono- and di-anions of 4,4'azobis(4-cyanovaleric acid), monoanions of monoperacids of dicarboxylic acids, and mono- and di-anions of diacylperoxides of dicarboxylic acids, etc.

The water-soluble organic-insoluble free-radical initiators preferred for the practice of the invention are the inorganic peroxymonosulfates and peroxydisulfates.

In general, the initial reaction mixture consists of two phases: the organic phase containing monomer and dissolved phase transfer agent, and a second phase containing the free-radical initiator. Proper choice of the phase transfer agent, initiator, and the optional solvent with respect to the polymerizable monomer will produce a substantially homogeneous mixture upon completion of the polymerization.

DETAILED DESCRIPTION

Examples of olefinic monomers which can be polymerized according to the invention are $\alpha,\beta$-unsaturated carboxylic acids such as acrylic acid, methacrylic acid, crotonic acid, itaconic acid, or their derivatives. Suitable derivatives include esters with mono-hydroxyl compounds such as methyl acrylate, butyl acrylate, 2-ethylhexyl acrylate or methyl methacrylate, or mono-esters with di- or poly-hydroxy compounds such as 2-hydroxyethyl acrylate, or amides or nitriles of these acids. Other suitable monomers include vinyl aromatics and heterocyclics such as styrene and vinylpyridines, vinyl esters of carboxylic acids such as vinyl acetate, N-vinyl derivatives of nitrogen-containing compounds such as N-vinyl-2-pyrrolidinone, or vinyl halides such as vinyl chloride or vinylidene chloride, fluorocarbon olefins, and the like.

Organic solvents useful for the present invention include any solvents known in the art for use in conducting free-radical polymerizations. These include such solvents as acetone, ethyl acetate, toluene, tertiary butyl alcohol, or aliphatic hydrocarbons or petroleum ethers such as hexane or heptane, or mixtures of two or more of these solvents.

A number of organic and inorganic, water-soluble organic-insoluble free-radical initiators in common use in the art are suitable for the purposes of this invention. Examples are salts of 4,4'-azobis-(4-cyanovaleric acid), such as the mono- or bis-ammonium, potassium or sodium salts, and inorganic persulfates, such as the ammonium, potassium or sodium peroxymonosulfates or peroxydisulfates. The readily available persulfates are preferred for economic reasons, with the peroxydisulfates being most preferred due to their greater stability and, therefore, greater ease of handling.

The phase transfer agents useful for the purposes of the present invention fall into several different classes of compounds. Among these are the macrocyclic multidentate compounds, commonly referred to as "crowns", crown ethers, cryptates or cryptands, or "lantern" or "clam" compounds. An extensive cataloging of these compounds can be found in J. J. Christensen, D. J. Eatough and R. M. Izatt, Chem. Rev., 74, 351 (1974). This article notes the strong affinity shown by multidentate macrocyclic polyethers for alkali and alkaline earth metal ions. Additional examples of this class of phase transfer agents are described in U.S. Pat. Nos. 3,987,061, 3,997,565 and 4,024,158 to DuPont, J. M. Lehn and F. Montavon, Helv. Chim. Acta., 59, 1566 (1976); U.S. Pat. No. 3,966,766 to J. M. Lehn (Schering Corporation); and U.S. Pat. Nos. 3,965,116, 4,001,279 and 4,043,979 to D. J. Cram. Furthermore, other heteroatom-containing macrocyclics capable of functioning as phase transfer agents due to their ability to form complexes with metal or ammonium cations are members of this class. The preferred "crowns" are the substituted and unsubstituted members of the 15-crown-5 and 18-crown-6 series due to their exceptional ability to complex the $Na^+$, $K^+$ and $NH_4^-$ cations. Most preferred of this class is the unsubstituted crown ether 18-crown-6.

A class of phase transfer agents which may be used to particular advantage for the purposes of the present invention are those typically referred to in the chemical literature as "phase transfer catalysts". These "catalysts" have the general structural formula, $(A_m M)^+ Y^-$, where A is an organic portion of the salt molecule bonded to M by m covalent linkages and $Y^-$ is any anion which will dissociate from $(A_m M)^+$ in an aqueous environment. Examples are the quaternary salts of the elements of Group VA of the Periodic Table of the Elements, as described extensively in U.S. Pat. No. 3,992,432 which is incorporated by reference to D. R. Napier and C. M. Starks (Continental Oil) and in several review articles cited hereinabove, and may be di- or multi-functional quaternary salts as well. Also included are organically soluble onium salts of Group VIA of the Periodic Table of the Elements, such as sulfonium salts (M=sulfur). The substituents "A" can vary in almost any manner, provided that they confer a suitable amount of organic-solubility to the cation $(A_mM)^+$. Preferably, "A" represents hydrocarbyl groups, and $(A_mM)^+$ may contain up to "m" different "A" groups. Of this class, the quaternary ammonium and phosphonium salts are preferred because of their ready availability and their inexpensive nature, with the ammonium salts being most preferred.

Many other monomeric or polymeric reagents which, by virtue of their complexing or chelating abilities, are capable of functioning as phase transfer agents may also be used for the purposes of the present invention. Among these are certain organically soluble primary, secondary or tertiary amines, some examples of which are described by H. Normant, T. Cuvigny and P. Savignac, *Synthesis,* 805 (1975), and by W. P. Reeves, et al., *Synthetic Communications,* 6, 193 and 509 (1976). These include N,N'-dimethylpiperazine, 1,4-diazabicyclo [2.2.2] octane, N,N,N',N'-tetramethylethylenediamine, n-butylamine, piperazine, tri-n-butylamine, etc. Certain dipolar, aprotic solvents may also act as phase transfer agents—a particular example is hexamethylphosphoric triamide. In general, most any cationic, anionic, nonionic or amphoteric surfactant will function to some extent as a phase transfer agent within the scope of the invention, as will linear polyether analogs of the crown ethers and cryptates such as the dimethyl ethers (e.g., glymes), the mono- or di-hydroxy derivatives (e.g., Carbowaxes), "octopus" molecules [See F. Fogtle, et al., *Angew Chem. Int. Ed. Engl.,* 16, 396 and 548 (1977)], and cyclotriveratrylene derivatives (U.S. Pat. No. 4,018,832 to Eastman Kodak Company). With the exception of the cationics, however, these types of phase transfer agents are generally not as efficient as the crown ethers or the more typical "phase transfer catalysts" for the purposes of the invention.

A polymerizable phase transfer agent may also be used within the scope of the invention.

In general, the initial reaction mixture consists of two phases: the organic phase containing monomer and dissolved phase transfer agent, and a second phase comprising the free-radical initiator. This second phase may be either a solid phase, as when a solid generator such as potassium peroxydisulfate is used, or a liquid phase, as when the initiator is dissolved in a small amount of water. Dissolution of the initiator in water appears to be completely optional. This is especially true for the case of the crown ether type of phase transfer agents, many of which are known to be capable of solid-to-liquid phase transfer. With the $(A_mM)^+Y^-$ type of phase transfer agents, however, very few instances of this type of phase transfer have been noted, and it was therefore unexpected that they would work in the absence of water. In general, however, it is preferred that up to about 5% by weight of the total polymerization mixture be water. Besides improving the homogeneity of the final product, this often shortens polymerization time due to increased efficiency of the phase transfer process. Mixtures containing greater than about 5% by weight of water generally exhibit phase separation as polymerization proceeds (even when water-miscible cosolvents such as acetone are used), and at higher water levels some gellation is observed. Although some of these polymers can be redissolved in appropriate solvents, no advantage is seen to be gained over the use of smaller amounts of water. About 2.5 to 3% by weight of water is most preferred for solution polymerizations, while the smallest amount possible, as determined by the solubility of the initiator, is preferred in bulk polymerizations.

The formation of the organically soluble free-radical initiator $(Q^+)_nX^{n-}$ of the invention from the combination of the water soluble initiator and the phase transfer agent is envisioned to occur according to what is known in the art concerning phase transfer catalysis. With crown ether and other nonionic types of phase transfer agents, it is believed that a complex is formed between the phase transfer agent and the cation of the water-soluble initiator to produce the organically-soluble cation $(Q^+)_n$. As this cation moves into the organic phase, the anion $X^{n-}$ (e.g., $S_2O_8^{2-}$) accompanies it and is available for initiating polymerization. With $(A_mM)^+Y^-$ type of phase transfer agents, the initiator of the invention is probably formed in an ion-pair extraction or double-decomposition type of reaction; that is, n anions $Y^-$ are exchanged for the anion $X^{n-}$ to produce the species $[(A_mM)^+]_nX^{n-}$ as the organically-soluble free-radical initiator $(A_mM^+{=}Q^+)$.

While the ability of crown ethers to complex metal and ammonium ions and thereby solubilize ionic compounds in organic media is well known in the art, this phenomenon has only been taken advantage of for the performance of ionic reactions. Furthermore, although the phase transfer of monovalent species is considered almost trivial, solubilization of divalent anions is not nearly so well known. Thus, the ease with which something like $S_2O_8^=$ can be phase transferred was completely unexpected. The most unexpected result found with the present invention, however, is the efficiency with which polymerizations can be carried out. Both of the common free-radical initiators, azobisisobutyronitrile and benzoyl peroxide, are known to have activation energies for decomposition of 31 kcal/mole, while that of potassium persulfate has been determined to be 33.5 kcal/mole. Yet, when polymerizations are run under identical conditions, an 18-crown-6/potassium persulfate combination of the present invention is superior to both of the other catalysts in terms of percent conversion to polymer. This difference is also reflected in the lower temperatures which may be used to effect polymerization. Thus, it is believed that complexation of the persulfate by the crown ether actually lowers the activation energy for decomposition, which is a completely unexpected result. Similar, and perhaps more dramatic, results are seen with the quaternary ammonium salts as phase transfer agents.

Activation of the novel free radical initiators $(Q^+)_nX^{n-}$ of the present invention, i.e., the actual free-radical producing process, can be accomplished by any of the techniques common in the art for activation of conventional initiators. In general, radical producing reactions are of two types: (1) fission of covalent bonds, and (2) transfer processes. Fission of covalent bonds may be achieved in a number of ways, the most commonly used techniques being thermal and photochemical. Transfer processes generally produce radicals by redox (oxidation-reduction) reactions. A more detailed description of free-radical formation is given by G. E. Eastmond in "Free-Radical Polymerization", Encyclopedia of Polymer Science and Technology, Vol. 7, N. M. Bikales, Editor, Interscience Publishers, New York, 1967, p. 361 ff.

Thermal activation of the initiators of the invention is conveniently accomplished in the range of about 30° C. to about 120° C., although higher or lower temperatures may be used. The exact temperature used for initiation is not critical to the invention, but may be varied to produce a desired end result as will be obvious to one skilled in the art. For instance, lower activation temperatures, such as from about 30° C. to about 50° C., are useful for the preparation of polymers having higher molecular weights or for the minimization of problems associated with exotherms. Utilization of higher activation temperatures, on the other hand, can be used to greatly reduce reaction times, thereby increasing production capability. The wide range of activation temperatures which may be utilized, together with the ease of handling and storage, make the present initiators unique among free-radical catalysts.

Photochemical activation of the initiators of the invention can be accomplished by irradiation of the polymerization mixtures with light from the ultraviolet or visible ranges, that is light of wavelength from about 185 nanometers to about 700 nanometers. The wavelength of light which can be used, and hence the appropriate light source, is dependent upon the absorption characteristics of the initiator used. For example, the peroxydisulfate ion is readily activated by 254 nm ultraviolet light, whereas azo-compounds may be activated by light of much longer wavelengths, e.g., 355 nm. As is well known to one skilled in the art, the use of photochemical sensitizers to provide a means for energy transfer to the initiator would also be a viable method of photochemical activation.

Regardless of the method of activation, polymerizations are generally carried out in conventional apparatus, preferably under an inert atmosphere.

EXAMPLES

The invention is illustrated by the following non-limiting examples. All monomers, catalysts, and solvents were used as obtained commercially, without purification or removal of inhibitors.

EXAMPLE 1

Potassium peroxydisulfate (1.35 g) and 18-crown-6 (2.64 g) were dissolved in distilled water (3 g). Acetone (90 ml, 71 g) was then added to this solution, whereupon some precipitate was formed. Addition of more distilled water (2 g) resulted in a homogeneous solution. Ethyl acrylate (50 g) was then added, thus producing a reaction mixture containing 1 mole % initiator as based on monomer charged. The solution was mechanically stirred and purged with argon for 15 minutes at room temperature, then heated at reflux for 30 minutes to give a quantitative conversion to poly(ethylacrylate).

EXAMPLE 2

A catalyst system consisting of potassium peroxydisulfate (0.34 g) and 18-crown-6 (0.70 g) was used to polymerize an otherwise identical monomer/solvent mixture to that of Example 1 (0.25 mole % initiator/monomer ratio). The reaction mixture was heated at reflux for 40 minutes to give a 91% conversion to poly(ethylacrylate) as measured using a standard gravimetric procedure to determine polymer solids.

EXAMPLES 3-6

This example is designed to show both the increased efficiency of the catalyst system of the present invention over conventional catalysts and the necessity of using a phase transfer agent. Reaction vessels were charged identically with distilled water (3 g), acetone (73 g), ethyl acrylate (50 g) and catalyst (0.1 mole % based on monomer), and polymerizations were conducted as in Example 1. Results are shown in Table I.

TABLE I

| Example | Catalyst | Reaction Time (hours) | % Conversion |
|---|---|---|---|
| 3 | $K_2S_2O_8 \cdot 2$ (18-crown-6) | 1.5 | 73 |
| 4 | Azobisisobutyronitrile | 1.5 | 58 |
| 5 | Benzoyl peroxide | 3.5 | 62 |
| 6 control | $K_2S_2O_8$ | 6.0 | 36[a] |

[a]Nonhomogeneous reaction mixture

EXAMPLES 7-12

These examples illustrate the use of other crown ethers and cryptands as phase transfer agents and also show that the water added in Examples 1 through 6 is unnecessary to the practicing of the invention. Reaction vessels were charged with n-butyl acrylate (45.5 g), acetone (71 g), potassium peroxydisulfate (0.135 g, 0.5 mmole) and crown ether (1.0 mmole), then purged for five minutes with Argon, sealed and tumbled in a constant temperature bath maintained at 55° C. for 24 hours. Results are shown in Table II. The percent conversions paralleled the known complexing abilities of these crowns for the potassium cation [J.J. Christensen, et al., *Chem. Rev.*, 74,351 (1974)].

TABLE II

| Example | Crown Ether | % Conversion |
|---|---|---|
| 7 | Dibenzo-18-crown-6 | 65 |
| 8 | Dicyclohexyl-18-crown-6 | 85 |
| 9 | 15-crown-5 | 63 |
| 10 | 18-crown-6 | 94 |
| 11 | [2 . 2 . 2]-cryptand[a] | 95 |
| 12 (control) | None | 14 |

[a]4,7,13,16,21,24-Hexaoxa-1,10-diazabicyclo [8 . 8 . 8]hexacosane

EXAMPLE 13

A reaction vessel was charged with 45.1 g of a mixture of isooctyl acrylate/acrylic acid (90:10 w/w), acetone (71 g) and distilled water (3 g). To this was added a catalyst system consisting of ammonium peroxydisulfate (0.114 g, 0.5 mmole) and 18-crown-16 (0.264 g, 1.0 mmole). The mixture was purged for five minutes with argon, sealed and tumbled in a constant temperature bath maintained at 60° C. for 24 hours to give 95% conversion to a copolymer which had $Mw = 2.29 \times 10^6$ by gel permeation chromatography.

EXAMPLES 14-18

Reactions identical to that of Example 13, using potassium peroxydisulfate (0.135 g, 0.5 mmole) in place of ammonium peroxydisulfate, were run at various temperatures to study the effect of temperature on the polymerization. Results are shown in Table III.

TABLE III

| Example | Temperature (°C.) | % Conversion | I.V. (THF) | $\overline{M}x$ |
|---|---|---|---|---|
| 14 | 60 | 95 | — | $2.09 \times 10^6$ |
| 15 | 50 | 95 | 1.95 | $4.53 \times 10^6$ |
| 16 | 45 | 96 | 2.44 | $6.06 \times 10^6$ |
| 17 | 40 | 95 | 3.24 | $8.12 \times 10^6$ |
| 18 | 35 | 92 | — | $7.67 \times 10^6$ |

EXAMPLES 19-22

Reaction mixtures identical to that of Example 14 were prepared, with the exception that the amount of 18-crown-6 used as phase transfer agent was varied. Polymerizations were performed according to the procedure of Example 7. Results are shown in Table IV.

TABLE IV

| Example | Temp. | 18-crown-6(mmol) | % Conversion | $\overline{M}w$ |
|---|---|---|---|---|
| 19 | 50° C. | 0.5 | 92 | $9.04 \times 10^6$ |
| 20 | 55° C. | 0.25 | 94 | $4.61 \times 10^6$ |
| 21 | 55° C. | 0.05 | 94 | $5.77 \times 10^6$ |
| 22[a] | 55° C. | 0.01 | 71 | — |

[a]Monomer polymerized was isooctyl acrylate (45.0g)

EXAMPLE 23

Butyl acrylate (45.5 g) in 1:1 w/w acetone/t-butyl alcohol (68 g) as solvent was polymerized according to the procedure of Example 7 using OXONE® (duPont's monopersulfate compound, the triple salt, $2KHSO_5 \cdot KHSO_4 \cdot K_2SO_4$) (0.307 g, 0.5 mmole) as the free-radical initiator. 18-crown-6 (0.5, 1.0, 1.5, 1.0 and 1.5 mmole) was used as phase transfer agent. Polymerizations were conducted at 60° C. for 26 hours, with all five samples showing 95–97% conversion to polymer.

EXAMPLES 24-30

Polymerization vessels were charged with potassium peroxydisulfate (0.135 g, 0.5 mmole) and distilled water (3 g) and swirled to effect dissolution of the persulfate. To this was added ethyl acetate (67 g), butyl acrylate (45.5 g) and a quaternary ammonium phase transfer agent (1 mmole) of the type $(A_mM)^{\oplus}Y^{\ominus}$ (Table V). Polymerization was conducted as in Example 7 at 55° C.

TABLE V

| Example | Phase Transfer Agent | Reaction Time (hours) | % Conversion |
|---|---|---|---|
| 24 | BuNHSO$_4$[a] | 21 | 97 |
| 25 | Aliquat 336[b] | 21 | 97 |
| 26 | CH$_3$(CH$_2$)$_{15}$C$_5$H$_5$NBr[c] | 24 | 92 |
| 27 | CH$_3$(CH$_2$)$_{15}$NMe$_3$Br[d] | 24 | 91 |
| 28 | (CH$_3$)$_4$NCl[e] | 24 | 43 |
| 29 | Br$_4$PBr[f] | 18.5 | 88 |
| 30 control | None | 21 | 10 |

[a]Tetra-n-butylammonium bisulfate
[b]Methyltricaprylylammonium chloride, General Mills, Inc.
[c]Hexadecylpyridinium bromide
[d]Cetyltrimethylammonium bromide
[e]Tetramethylammonium chloride
[f]Tetra-n-butylphosphonium bromide

EXAMPLES 31-42

These examples are designated to illustrate the effect of added distilled water on the course of polymerizations using the catalysts of the present invention. Reaction vessels were charged with n-butyl acrylate (45.5 g), potassium peroxydisulfate (0.135 g, 0.5 mmole), Aliquat 336 (0.507 g, 1 mmole) and solvent. Polymerizations were conducted as in Example 7 at 55° C. for the designated time. Results are shown in Table VI.

TABLE VI

| Example | Solvent Ethyl Acetate | (grams) Acetone | Water (grams) | Reaction Time (hours) | % Conversion |
|---|---|---|---|---|---|
| 31 | 67 | — | 0 | 15.5 | 94[a] |
| 32 | 67 | — | 3 | 21 | 97[b] |
| 33 | 65 | — | 5 | 16 | 98[b] |
| 34 | 60 | — | 10 | 16 | 98[c] |
| 35 | 55 | — | 15 | 16 | 98[d] |
| 36 | 50 | — | 20 | 16 | 96[d] |
| 37 | 40 | — | 30 | 16 | 99[d,e] |
| 38 | — | 65 | 5 | 14.5 | 98[b] |
| 39 | — | 60 | 10 | 14.5 | 98[d] |
| 40 | — | 55 | 15 | 14.5 | d,e |
| 41 | — | 50 | 20 | 14.5 | d,e |
| 42 | — | 40 | 30 | 14.5 | d,e |

[a]Particulate matter suspended in polymer solution
[b]Homogeneous polymer solution
[c]Nonhomogeneous, becomes homogeneous after dilution with acetone
[d]Nonhomogeneous, becomes homogeneous after dilution with THF
[e]Gelled or crosslinked polymer

EXAMPLES 43-46

Isooctyl acrylate (45.0 g) was polymerized by the method of Example 7 using potassium peroxydisulfate (0.135 g, 0.5 mmole) and Aliquat 336 (0.507 g, 1 mmole) as initiator in ethyl acetate (68 g)/distilled water (3 g) as solvent at various temperatures. Results are shown in Table VII.

TABLE VII

| Example | Temperature (°C.) | % Conversion | $M_w$ |
|---|---|---|---|
| 43 | 55 | 99 | $3.34 \times 10^6$ |
| 44 | 45 | 99 | $5.82 \times 10^6$ |
| 45 | 40 | 95 | — |
| 46 | 35 | 91 | — |

EXAMPLE 47

(a) A saturated solution of ammonium peroxydisulfate (10 ml) was shaken for 15 minutes with a solution of Aliquat 336 (1.01 g) dissolved in ethyl acetate (10 ml). A 5 ml portion of the ethyl acetate layer was withdrawn and added to a mixture of butyl acrylate (45.5 g) in ethyl acetate (67 g). Polymerization was conducted according to Example 7 at 55° C. for 19 hours to give 96% conversion to poly(butyl acrylate).

(b) Another sample of the ethyl acetate initiator solution from (a) above was concentrated in vacuo to remove the solvent, thus yielding a colorless oil displaying strong infrared absorption bands at 1265 and 1040 cm$^{-1}$, typical of the peroxydisulfate ion.

(c) A control run identically to (a) above, but without Aliquat 336, showed no evidence of polymerization.

EXAMPLES 48-49

Polymerizations were conducted identically to that of Example 26 using an anionic (sodium dodecylsulfate) and a nonionic (Surfonic N-150, C$_9$H$_{19}$C$_6$H$_4$O(CH$_2$CH$_2$O)$_{15}$H) surfactant as phase transfer agents. Results are recorded in Table VIII.

TABLE VIII

| Example | Phase Transfer Agent | % Conversion |
|---|---|---|
| 48 | Sodium dodecylsulfate | 28 |
| 49 | Surfonic[a] N-150 | 20 |

[a]Trademark of Jefferson Chemical Company

EXAMPLE 50

Methyl methacrylate (50 g) was polymerized, using the solvent and initiator system of Example 25, for 22 hours at 60° C. to give 75% conversion to poly(methyl methacrylate).

EXAMPLE 51

A mixture of isooctyl acrylate (100 g), ammonium peroxydisulfate (0.1002 g), Aliquat 336 (0.1030 g) and distilled water (3 g) was shaken for several minutes to assure good mixing. A 5 ml sample of the mixture was withdrawn and placed in a test tube. The mixture was purged by addition of a small piece of dry ice followed by blanketing the test tube and contents with nitrogen. A thermocouple attached to a linear recorder was inserted into the mixture, and the mixture immersed in a constant temperature bath maintained at 62° C. Progress of the bulk polymerization was followed by recording a time/temperature curve. An exotherm was observed which reached a maximum of 95° C. at 2.25 minutes after the sample reached bath temperature. The temperature of the sample returned to 62° C. after about ten minutes total reaction time. The poly(isooctyl acrylate) was produced in 87% conversion and had an intrinsic viscosity in ethyl acetate of 2.24. A similar reaction run at 40° C. showed an exotherm to 46° C. and gave a 76% conversion to polymer. By comparison, a control run at 62° C. using azobisisobutyronitrile showed an induction period of about 2.25 minutes followed by a rapid exotherm (0.9 minutes) to a maximum of 134° C.

EXAMPLES 52–56

Polymerization mixtures were prepared of butyl acrylate (45.5 g), acetone (71 g) and potassium peroxydisulfate (0.335 g, 0.5 mmole). Selected nonionic phase transfer agents (1.0 mmole) were added (Table IX) and the resulting mixtures were polymerized according to Example 7 at 55° C. for 24 hours.

TABLE IX

| Example | Phase Transfer Agent | % Conversion |
|---|---|---|
| 52 | TMEDA[a] | 37 |
| 53 | DABCO[b] | 51 |
| 54 | DMP[c] | 66 |
| 55 | HMPT[d] | 72 |
| 56 | Surfonic[e] N-150 | 49 |

[a]N,N,N',N'-tetramethylethylenediamine
[b]1,4-diazabicyclo[2.2.2]octane
[c]N,N'-dimethylpiperazine
[d]Hexamethylphosphoric triamide
[e]Trademark of Jefferson Chemical Company

EXAMPLE 57

This example illustrates the use of a polymerizable, amphoteric phase transfer agent. Potassium peroxydisulfate (0.135 g, 0.5 mmole) was dissolved in distilled water (3 g). To this was added ethyl acetate (89.3 g), butyl acrylate (58.2 g) and "DHA(8)" (5 g), which is Ashland Chemical's aminimide monomer having the structure:

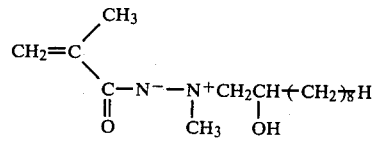

The mixture was polymerized at 55° C. for 24 hours according to the procedure of Example 7. The very viscous polymer solution was diluted by addition of ethyl acetate (67 g) and the resultant solution determined to contain 26% solids (92% conversion to polymer).

EXAMPLE 58

This example compares the efficiency of the potassium peroxydisulfate/Aliquat 336 and potassium peroxydisulfate/hexadecylpyridinium bromide initiator system of the present invention to that of azobisisobutyronitrile. Polymerization mixtures were prepared according to the recipe of Examples 25 and 26, and percent conversion was measured as a function of polymerization time at 55° C. (Table X). For the control, azobisisobutyronitrile (0.082 g, 0.5 mmole) was used as initiator.

TABLE X

| Catalyst | Time (hours) | % Conversion |
|---|---|---|
| $K_2S_2O_8$/Aliquat 336 | 1 | 73 |
| " | 2 | 89 |
| " | 3 | 93 |
| " | 4 | 95 |
| " | 5 | 96 |
| $K_2S_2)_8$/$CH_3(CH_2)_{15}C_5H_5NBr$ | 1 | low |
| " | 2 | 44 |
| " | 3 | 76 |
| " | 4 | 87 |
| " | 5 | 87 |
| Azobisisobutyronitrile | 2 | 0 |
| " | 5 | 36 |
| " | 9.5 | 77 |

EXAMPLE 59

This example illustrates the use of water-soluble free-radical initiators other than persulfates. 4,4'-azobis(4-cyanovaleric acid) (2.15 g, specified by Aldrich Chemical Company, Inc. to be of 65% purity, the remainder water) was suspended in 5 ml distilled water and neutralized with the requisite amount of potassium hydroxide in 5 ml distilled water. A polymerization vessel was then charged with butyl acrylate (45.5 g), ethyl acetate (67 g), Aliquat 336 (0.507 g, 1 mmole) and 1 ml of the above initiator solution (0.5 mmole initiator). Polymerization was conducted at 55° C. for 15 hours to give an 83% conversion to polymer. A control without Aliquat 336 showed no evidence for polymerization.

EXAMPLE 60

A mixture of butyl acrylate (45.5 g), potassium peroxydisulfate (0.135 g, 0.5 mmole), lecithin (0.8 g, Eastman Chemical Company practical grade), distilled water (3 g) and acetone/hexane solvent (67.6 g of a 35:65 w/w mixture) was polymerized at 55° C. for 22 hours according to the procedure of Example 7 to give an 87% conversion to poly(butyl acrylate).

EXAMPLE 61

A mixture of 2-ethylhexyl acrylate (50 g), potassium peroxydisulfate (0.135 g, 0.5 mmole), cetyldimethylamine oxide (0.285 g, 1 mmole), distilled water (3 g) and ethyl acetate (75.6 g) was polymerized at 55° C. for 18 hours according to the procedure of Example 7 to produce poly(2-ethylhexyl acrylate) in 97% conversion.

What is claimed is:

1. A process for the polymerization of free-radical polymerizable, ethylenically unsaturated monomeric material comprising:
   (1) placing in a suitable vessel an organic liquid comprising said polymerizable, ethylenically unsaturated monomeric material;
   (2) adding to said organic liquid:
      (a) a water-soluble, organic-insoluble free-radical initiator, and
      (b) an organic phase transfer agent capable of complexing with said initiator to produce an adduct which is soluble in said organic liquid and has the general formula $(Q^+)_n X^{n-}$, wherein $Q^+$ is
         (i) a cation complex of an alkali or alkaline earth metal or ammonium cation and a neutral donor molecule selected from the group consisting of multidentate compounds, an amine selected from the group consisting of N,N'-dimethylpiperazine, 1,4-diazabicyclo octane, N,N,N',N'-tetramethylethylenediamine, piperazine hexamethyl phosphoric triamide, amphoteric compounds; or
         (ii) a cation having the formula $(A_m M)^+$ where A is an organic radical having from one to eighteen carbon atoms bonded to M by m covalent linkages and M is an element selected from Groups VA and VIA of the Periodic Table of Elements;
      and $X^{n-}$ represents the anionic residue of a free-radical initiator having a valency of n which is capable of producing free-radicals upon activation, and n is an integer of 1 or 2;
   (3) activating said adduct to produce free-radicals; and
   (4) permitting said free-radicals to cause said monomeric material to polymerize.

2. The process of claim 1 wherein $X^{n-}$ is an anion selected from the group consisting of mono- and di-anions of peroxydisulfuric acid, peroxydiphosphoric acid and peroxydicarbonic acid, peroxymonosulfate, azo free radical generators, e.g., mono- and di-anions of 4,4'azobis (4-cyanovaleric acid), monoanions of monoperacids of dicarboxylic acids, and mono- and di-anions of diacylperoxides of dicarboxylic acids.

3. The process of claim 1 wherein said adduct is formed by reacting 18-crown-6 and potassium peroxydisulfate.

4. The process of claim 1 wherein said adduct is formed by reacting a quaternary ammonium salt and potassium peroxydisulfate.

5. The process of claim 4 wherein said quaternary ammonium salt is methyltricaprylylammonium chloride.

6. The process of claim 4 wherein said quaternary ammonium salt is tetra-n-butylammonium bisulfate.

7. The process of claim 4 wherein said quaternary ammonium salt is cetyltrimethylammonium bromide.

8. The process of claim 4 wherein said quaternary ammonium salt is hexadecylpyridinium bromide.

* * * * *

UNITED STATES PATENT AND TRADEMARK OFFICE
CERTIFICATE OF CORRECTION

PATENT NO. : 4,326,049
DATED : April 20, 1982
INVENTOR(S) : Jerald K. Rasmussen

It is certified that error appears in the above—identified patent and that said Letters Patent is hereby corrected as shown below:

In the Specification:

Col. 4, line 50, "$NH_4-$" should read --$NH_4^+$--.

Col. 8, line 28, "74,351" should read --74, 351--.

Col. 9, line 45, "$BuNHSO_4$" should read --$Bu_4NHSO_4$--.

Col. 11, line 35 "(0.9 minutes)" should read --(0.9 minute)--.

In the Claims:

Claim 1, Col. 13, lines 28 and 29, "1,4-diazabicyclo octane" should read --1,4-diazabicyclo [2.2.2] octane--.

Signed and Sealed this

Twentieth Day of July 1982

[SEAL]

Attest:

Attesting Officer

GERALD J. MOSSINGHOFF

Commissioner of Patents and Trademarks